Aug. 15, 1967   C. A. SECKERSON ET AL   3,335,471
FASTENER FOR METAL PLATES

Filed Sept. 17, 1964

2 Sheets-Sheet 1

INVENTORS
CLIFFORD ALEXANDER SECKERSON,
GEORGE NOEL CROWTHER AND
ERNEST JOHN HAMMER.

by Walter L. Jones.
Attorney.

Aug. 15, 1967     C. A. SECKERSON ET AL     3,335,471
FASTENER FOR METAL PLATES

Filed Sept. 17, 1964                                2 Sheets—Sheet 2

INVENTORS
CLIFFORD ALEXANDER SECKERSON,
GEORGE NOEL CROWTHER AND
ERNEST JOHN HAMMER.

by Walter L. Jones
Attorney.

United States Patent Office 3,335,471
Patented Aug. 15, 1967

3,335,471
FASTENER FOR METAL PLATES
Clifford Alexander Seckerson, Iver Heath, Buckingham, George Noel Crowther, Hillingdon, Middlesex, and Ernest John Hammer, South Norwood, London, England, assignors to United-Carr Incorporated, Boston, Mass., a corporation of Delaware
Filed Sept. 17, 1964, Ser. No. 397,094
Claims priority, application Great Britain, Sept. 20, 1963, 37,122/63
1 Claim. (Cl. 24—221)

The present invention relates to an improved fastener which is particularly, although not exclusively suitable for use as a vehicle bonnet or radiator grill locking handle.

According to the invention there is provided a fastener, made of resilient material such as a synthetic plastics, for securing two members together, the fastener comprising a shank, a handle at one end of the shank, a transverse bore at the other end of the shank, a locking pin in the bore extending outwardly from opposite sides of the shank and, located on the shank between the handle and the pin, a cup-shaped flange having its concave face directed towards the pin, the shortest distance between the pin and the flange being not greater than the overall thickness of the two members when in their secured position.

According to another aspect of the invention there is provided an assembly of two apertured members secured together with the aid of a fastener as defined in the preceding paragraph, wherein the two members are gripped between the flange and the pin, the member adjacent the flange is formed with an aperture which has a clearance around the shank of the fastener, and the other member is formed with a bayonet-type of slot in which the shank and pin may be engaged as a bayonet-type of fitting.

Figure 1:
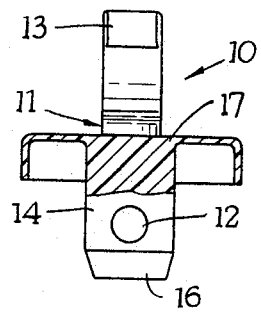
Figure 2:
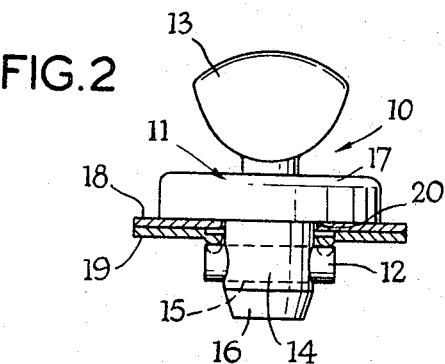
Figure 3:
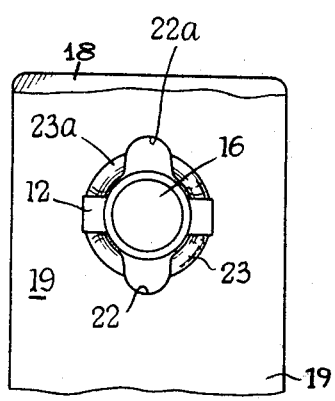
Figure 4:
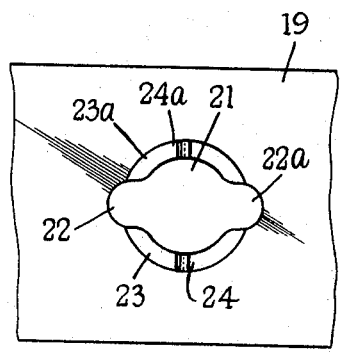
Figures 5, 6:
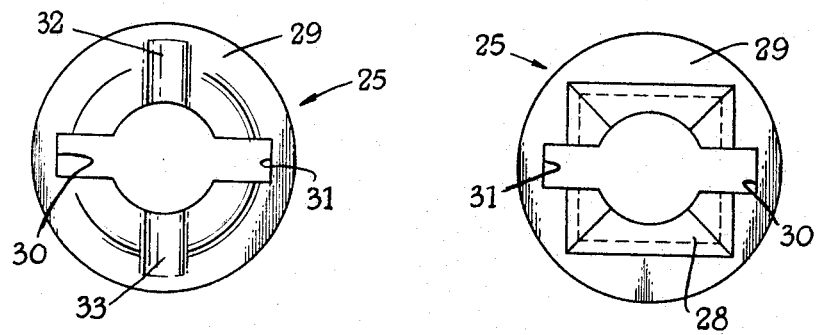
Figure 7:
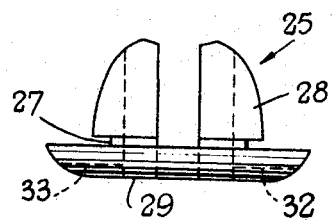
Figure 8:
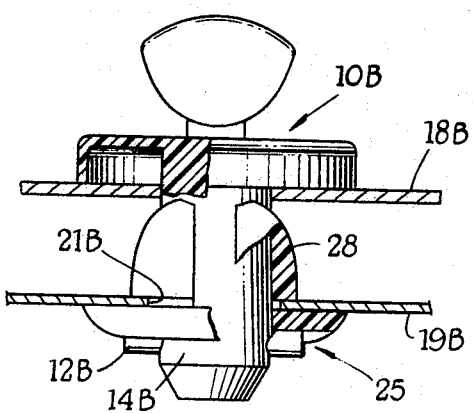

Preferred forms of the invention will now be described with reference to the accompanying drawings in which:

FIGURE 1 is a side elevation, partly in section, of the two-part fastener,

FIGURES 2 and 3 are respectively an elevation and underplan of the fastener of FIGURE 1, shown in its locked position as used for attaching two apertured panels together, FIGURE 4 is an underplan of one of the apertured panels of FIGURES 2 and 3, FIGURES 5, 6 and 7 are respectively an underplan, a plan, and elevation of a bush forming part of another fastener, and FIGURE 8 is a side elevation, partly in section, of an assembly incorporating the fastener shown in FIGURES 1 and 2 and the bush of FIGURES 5, 6 and 7.

In FIGURE 1 a two-part fastener is indicated generally at 10.

The two-part fastener 10 shown in FIGURES 1, 2 and 3 is preferably formed from a mouldable material such as a synthetic plastics. The two parts consist of a body portion 11 and a retaining pin 12.

The body portion 11 comprises a flat handle in the form of a finger-grip 13, and a cylindrical shank 14 which has a transverse through bore 15 near its free end 16 and a circumferential resilient flange 17 adjacent the finger-grip. The flange is substantially cup-shaped and has its concave side towards the pin 12.

The free end 16 of the shank is tapered to form a frusto-conical nose and the retaining pin 12 is a tight push fit in the bore 15.

The fastener 10 may be used to attach two apertured panels 18 and 19 together in the manner shown in FIGURES 2 and 3.

The panel 18 is formed with a circular aperture of such dimensions that the shank 14 is a close fit therein, and the panel 19 has an aperture 21 which is generally circular and formed with a pair of diametrically opposed slots 22, 22a. The rim of the circular portions of the aperture 19 is stamped to one side of the panel to form raised circumferential ribs 23, 23a each of which has an indentation 24 and 24a respectively.

In order to attach the panels 18 and 19 together the shank 14 of the body portion of the fastener 10 is inserted through the aperture 20 in the panel 18 and the pin 12 is then pressed home into the transverse bore 15 to retain the fastener in the aperture.

The panel 18 is then brought up to the panel 19 and the shank of the fastener is rotated, by means of the finger-grip 13, until the projecting ends of the pin 12 are aligned with the diametrically opposed slots 22, 22a. The shank 14 is then passed through the aperture 21 and rotated through 90° so that the projecting ends of the pin 12 ride up on the ribs 23, 23a and seat in the indentations 24 and 24a respectively.

The shape and dimensions of the fastener 10 are such that when the shank is rotated into the locked position the flange 17 is drawn down tightly on to the panel 18 and the two panels are secured together firmly. For this to be possible, the shortest distance between the pin 14 and the flange 17 must be not greater than the overall thickness of the two panels, including the ribs 23 and 23a.

The resilient flange 17 provides a spring pressure on the two panels 18 and 19 and, in addition, seals the apertures in the two panels.

In order to release the assembly the shank 14 is pressed down onto the panels, rotated through 90°, in either direction, and then withdrawn from the apertures in the panels.

In use the body portion 11 of the fastener may conveniently be attached permanently, with the aid of the pin 12, to the bonnet of a vehicle. An appropriate portion of the frame of the vehicle is provided with an aperture, similar to the aperture 21 in the panel 19, but preferably larger so that the shank is a loose fit in the aperture and the fastener 10 thus provides a bonnet catch which is easily manually operated, rattle-free and rustproof.

In a modification of the assembly shown in FIGURE 8, the lower panel 19B is provided with a non-circular, for instance square, aperture 21B and a resilient bush 25 is provided to fit in the non-circular aperture and receive a fastener 10B.

The bush 25, which is shown in FIGURES 5 to 7, has a neck in the form of an external groove 27 adapted to fit on the rim of the aperture 21B, a split skirt 28 which can be pressed through the aperture 21B, as seen in FIG. 8, and an annular head 29 adjacent the groove 27 which seats on a surface of the panel 19B.

The bore of the bush 25 is substantially cylindrical and adapted to receive the shank 14B of the fastener 10B but it is also formed with two longitudinal grooves 30, 31 which allow the ends of the pin 12B of the fastener 10B to pass through the bush.

The annular head 29 of the bush 25 is formed with two opposed depressions 32, 33 which serve the same purposes as the indentations 24, 24a in the panel 19 of FIGURES 3 and 4.

In use the bush 25 is assembled on the panel 19B by forcing the split skirt 28 upwardly through the aperture 21B until the neck or groove 27 snaps over the rim of the aperture.

The shank 14b of the fastener 10B is passed through the aperture in the panel 18B, in the manner described above with reference to FIGURES 1 to 4, the panel 18B is brought adjacent the panel 19B and the shank 14B is then passed through the bush 25 in the panel 19B so that the pin is clear of the head 29 whereupon the fastener 10B is rotated until the ends of the pin 12B are seated in the depressions 32, 33. The pressure on the fastener is then released and the two panels 18B and 19B are held securely together.

It will be seen that, as the external shape of the bush 25 is non-circular, and fits into a non-circular aperture 21B, it cannot rotate in the aperture 21B when the shank of the fastener 10B is rotated.

The provision of the bush 25 avoids the necessity for stamping ribs in the panel 19 and it will be appreciated that a bush similar to the bush 25 could be made for use in a circular aperture provided that means are provided to ensure that it cannot rotate in the aperture when the shank of the fastener is rotated.

In any of the embodiment described above the flange, e.g., the flange 17 of FIGURE 1, may be a friction fit on the shank of the fastener.

All of the embodiments described above involve the use of a shank carrying a transverse pin, co-operating with an aperture formed with a pair of oppositely disposed extensions. Such a fastening device is well known and is often referred to as a bayonet-type of fitting engaging in a bayonet-type of slot. These expressions are used in the claim which follows.

What we claim is:

An assembly comprising a pair of apertured members and a fastener, said apertured members being secured against movement toward each other at said fastener, said fastener comprising a male member including a shank and a handle at one end of said shank, a locking pin extending outwardly from opposite sides of said shank at its end remote from said handle, and in integral flexible cup-shaped flange surrounding said shank between said handle and said pin, and a female member having the form of a one-piece molded plastic bush including an apertured head having a pair of slots formed at diametrically opposite sides of the aperture in said head, and having a pair of opposite depressions formed in the lower surface of the annular portion about said aperture, a split flexible skirt extending upwardly from said head, the internal walls of said skirt defining a substantially cylindrical bore and diametrically opposite slots in axial continuity with the aperture and with the slots in said head, and the base of said skirt having an external groove formed therein adjacent said head, whereby said bush is snappedly seated in the aperture in one of said apertured members, so that said head overlies a surface of said one apertured member, said skirt being located between said apertured members, the edge of the aperture in said one member being seated in the groove in said bush, the flange on said male member overlying a surface of the other of said members, and said shank extending through the aperture in said other member, the bore in said bush, and the aperture in the head of said bush, so that, after passage of said locking pin through the slots of said head and skirt and rotation of said fastener so as to bring said pin into the depressions in said head, said locking pin will be maintained seated in said depressions, whereby rotation of said male member from a locked position will be resisted and the assembled apertured members and fastener will be maintained in firm relationship.

References Cited
UNITED STATES PATENTS

| | | | |
|---|---|---|---|
| 1,721,819 | 7/1929 | Hughes | 24—141 |
| 2,179,604 | 11/1939 | Tinnerman. | |
| 2,291,975 | 8/1942 | Minero | 24—221 X |
| 2,337,483 | 12/1943 | Marty | 27—221 |
| 2,372,496 | 3/1945 | Huelster | 24—221 |
| 2,373,722 | 4/1945 | Von Opel | 24—221 |

WILLIAM FELDMAN, *Primary Examiner.*

E. SIMONSEN, *Assistant Examiner.*